(12) United States Patent  
Thirumalainambi et al.

(10) Patent No.: US 9,141,604 B2  
(45) Date of Patent: Sep. 22, 2015

(54) HUMAN EMOTION ASSESSMENT REPORTING TECHNOLOGY—SYSTEM AND METHOD

(71) Applicant: RIAEX INC., Sunnyvale, CA (US)

(72) Inventors: Rajkumar Thirumalainambi, Cupertino, CA (US); Shubha Ranjan, Fremont, CA (US)

(73) Assignee: RIAEX INC, Sunnyvale, CA (US)

( * ) Notice: Subject to any disclaimer, the term of this patent is extended or adjusted under 35 U.S.C. 154(b) by 315 days.

(21) Appl. No.: 13/775,086

(22) Filed: Feb. 22, 2013

(65) Prior Publication Data

US 2014/0244264 A1     Aug. 28, 2014

(51) Int. Cl.
*G10L 21/00* (2013.01)
*G06F 17/27* (2006.01)
*G10L 25/63* (2013.01)

(52) U.S. Cl.
CPC ........ *G06F 17/2785* (2013.01); *G06F 17/2735* (2013.01); *G10L 25/63* (2013.01)

(58) Field of Classification Search
None
See application file for complete search history.

(56) References Cited

U.S. PATENT DOCUMENTS

| | | | | | |
|---|---|---|---|---|---|
| 6,151,571 | A | * | 11/2000 | Pertrushin | 704/209 |
| 8,054,964 | B2 | * | 11/2011 | Flockhart et al. | 379/265.07 |
| 2011/0040155 | A1 | * | 2/2011 | Guzak et al. | 600/300 |
| 2013/0030812 | A1 | * | 1/2013 | Kim | 704/270 |

* cited by examiner

*Primary Examiner* — Benny Q Tieu
*Assistant Examiner* — Sunil Chacko
(74) *Attorney, Agent, or Firm* — Geeta Kadambi; Riddhi IP LLC

(57) ABSTRACT

The present disclosure describes a novel method of analyzing and presenting results of human emotion during a session such as chat, video, audio and combination thereof in real time. The analysis is done using semiotic analysis and hierarchical slope clustering to give feedback for a session or historical sessions to the user or any professional. The method and system is useful for recognizing reaction for a particular session or detection of abnormal behavior. The method and system with unique algorithm is useful in getting instant feedback to stay the course or change in strategy for a desired result during the session.

20 Claims, 17 Drawing Sheets

HUMAN EMOTION ASSESSMENT REPORTING TECHNOLOGY—SYSTEM AND METHOD

FIELD OF TECHNOLOGY

This disclosure relates generally to a field of system and method of processing human emotion assessment reporting technology (HEART) using semiotic analysis for chat, video and audio sessions between users in real time.

BACKGROUND

Communication between people provides modes of expressing their emotions in various ways. There are various software's that perform analysis of these communications after the communication has occurred and finished. There are very few analysis tools that can perform the analysis in real time and also perform the analysis of emotion expressed via chat, video and audio communication methods. There is a need for instant feedback and analysis tool to analyze human emotion during a communication session. Normally a person shows an emotion during a session as a reaction or a response to a particular situation. The human brain first perceives the session by syntactically, semantically, somatically and then pragmatically analyzing the communication content. Computer programs are very efficient in analyzing text, audio and video data using syntactic and semantic data. Computers lack semiotic and pragmatic analysis process to a reaction or a response for a human emotion during a communication session. There is a need to perform a technically challenging analysis of human emotions to get closer to predicting the real emotional state of a person.

SUMMARY

Disclosed herein are a method and system to capture, dynamically analyze and display the result of expressed human emotion using varied data such as, but not limited to, text, audio, video and combination thereof for individual or multiple users during a session of communication. In one embodiment, a text is analyzed for expressed human emotion in real time and the results are displayed. In another embodiment a system for analyzing the text using semiotic analysis is described. In one embodiment, semiotic analysis is done by parsing the text using natural language processing.

In one embodiment, an emotion dictionary is initialized to be used for calculating a weight for a given word as an emotion value for an expressed or responded emotion during a communication session using a human emotion assessment recording technology system in a processor hosted in at least one of the computer device used by the first user, the second user and a central middleware connecting the computer device used by the first user and the second user through a network. In another embodiment, a computer device may be a computer, tablet, mobile devices, phones, radio, television, laptops and any electronic means used for communication.

In one embodiment, an expressed human emotion by the first user and the second user as a first data and a response to the human emotion as a second data while using the session for the chat, video, audio and a combination thereof by the first user and the second user is stored in a database. In another embodiment, a semiotic analysis is performed using the processor on the first data and second data to create a baseline data for the first user and second user and a subsequent data for the first user and second user. In another embodiment, human emotion value is displayed as a human emotion assessment reporting technology data in a graphical representation by performing hierarchical slope clustering on the baseline data and subsequent data in a real time. In another embodiment, all the data produced is stored in a database along with emotion dictionary.

In one embodiment, emotion dictionary is populated using Seekingwords, LIWCwords, Forrestwords, Wordnetwords, Bodywords, Legalwords, Ridwords, Buddhawords, Interjections, Rogetwords and Layergarywords, but not limited to these.

In one embodiment, semiotic analysis consists of estimating a value for a sign, wherein a sign has three components comprising a sense, signifier and referent. In another embodiment, the text is parsed using the natural language processor parser and applying an English grammatical structure to assign varied values for the first data and the second data. The varied values, in one embodiment comprises at least one of who, whom, when, where, why, how, session ID, timestamp, sender ID, receiver ID, number of sentences and number of words. In another embodiment, parts of speech are applied to tag a significant word to the first data and the second data to create a weight. A historical analysis, in one embodiment is performed to view a trend in communication session over a period of time.

In one embodiment, a n×11 matrix for the first data and the second data after matching with words from the dictionary in real time for a given chat session is populated and real time is an one minute interval and near real time is 2-3 minute intervals. In one embodiment, a singular value decomposition algorithm using the processor is used to reduce the n×11 matrix to create the human emotion assessment reporting technology data displaying the human emotion assessment reporting technology data as a representation of a human emotion value.

In another embodiment, Principal Component Analysis for the human emotion assessment reporting technology data to calculate the human emotion value for the first user and the second user over a period of time In another novel embodiment, a hierarchical slope clustering is performed for the human emotion assessment reporting technology data to calculate a human emotion value for the first user and the second user over a period of time.

In one embodiment, when the communication session is in the form of audio data is captured and a pitch analysis, frequency analysis and filtering analysis for identification of a sign and interpretation of the sign for the audio session as a human emotion assessment reporting technology data is performed. In another embodiment, the results are displayed for the human emotion assessment reporting technology data as the human emotion value.

In another embodiment, when the communication session is in the form of video, sampling the video session for first user and second user for 5-10 frames per second, feature extraction is done and motion analysis, growth and decay analysis to create data for motion cluster analysis. The sign is extracted from the motion cluster. The results are displayed and the entire calculation is stored in the database in another embodiment.

In another embodiment, at the system level a processor is used to house the human emotion assessment reporting technology engine to initiate the middleware server and a natural language processing server; a middleware is used to process a session consisting at least one of a chat, video, audio and combination thereof between a first user and a second user and perform semiotic analysis; and a database is used to store a first user data and a second user data and a semiotic analysis data and historical analysis data along with human emotion values.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Several method and systems for processing and analyzing human emotion in real time for a session of chat, video, audio and combination thereof between users using human emotion assessment reporting technology (HEART) are disclosed. In the embodiments it is described that semiotic analysis is performed on the general communication session between users such as chat, video, audio or combination thereof. Although the present embodiments have been described with reference to specific example embodiments, it will be evident that various modifications and changes may be made to these embodiments without departing from the broader spirit and scope of the various embodiments.

Chat session or online chat refers to any kind of communication over the Internet, which offers a real-time direct transmission of text-based messages from sender to receiver; hence the delay for visual access to the sent message shall not hamper the flow of communications in any of the directions. Chat addresses point-to-point communications as well as multicast communications from one sender to many receivers. Processing may include extracting, analyzing, modeling and presenting the data produced by communication between users.

Figure 1:
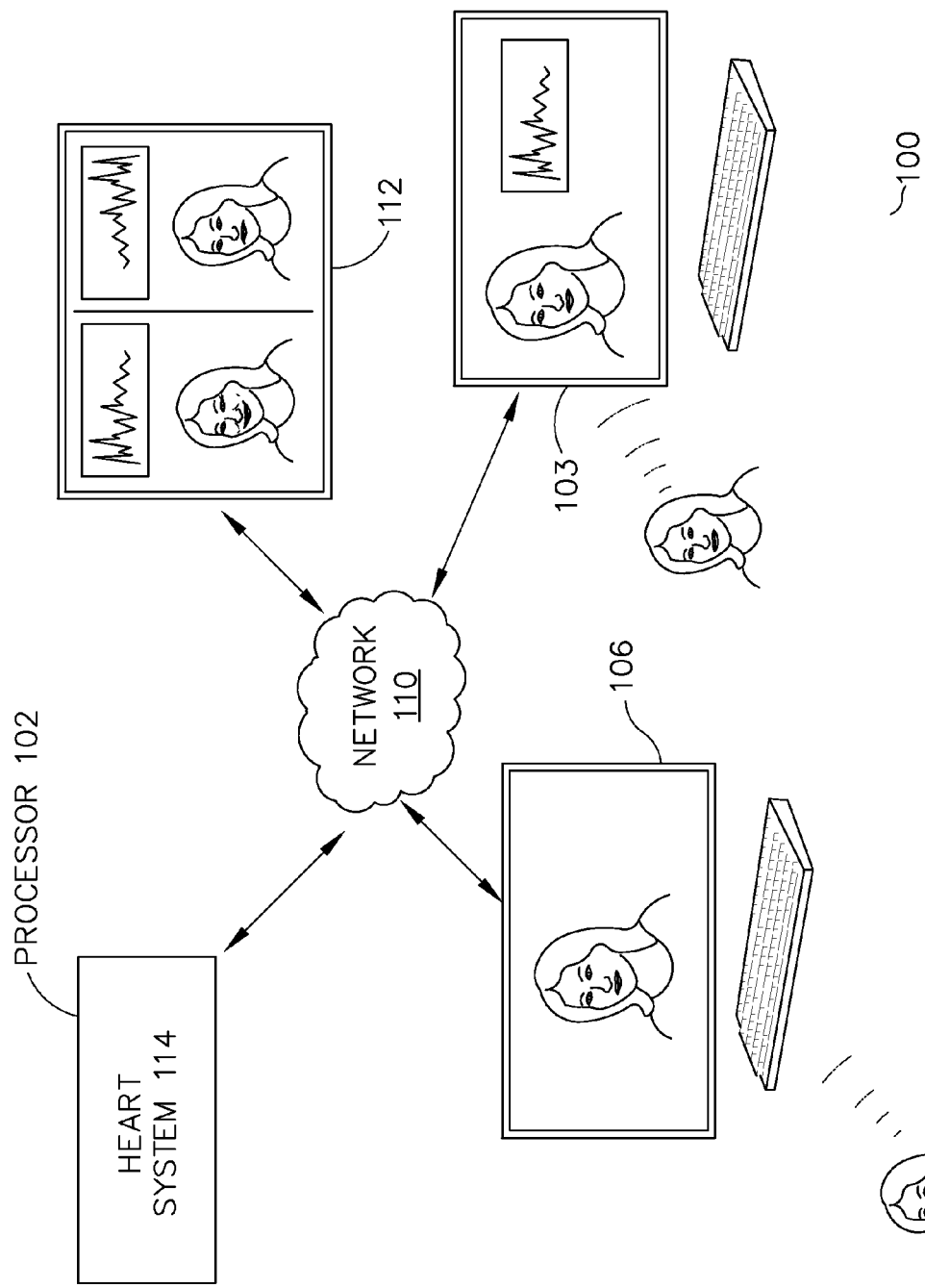
FIG. 1 shows a systematic view of an integrated system for human emotion assessment reporting technology (HEART) 100, according to one embodiment.

FIG. 1 shows a systematic view of an integrated system for human emotion assessment reporting technology (HEART) 100 illustrating communication between user and the server through a network 110, according to one embodiment. In one embodiment a user 106 or multiple users 106 and 103 may connect to the processor 102 that hosts the HEART system. In another embodiment, the user hardware such as a PDA, mobile device such as tablets etc., computer or a mobile phone or any wireless device, or an electronic book (e-book) may be connected with each other or work independently to allow the user to use chat, video, audio or combination thereof for communicating with each other. The network 110 may be a LAN, WAN, mobile, telecommunications, internet, intranet, WiFi and/or ZigBee network, etc. The user/individual 106, 108 and 112 and so on may be a user or a group of users. The user and individual are used interchangeably and mean the same. The user may be any person who accesses human emotion assessment reporting technology (HEART) for communication and to make informed decisions based on the output from the human emotion assessment analysis. The HEART may be accessed after the initialization of the session using text, audio, video and combination thereof has started between users. In another embodiment, a supervisor 112 may observe a session of communication between users and see the results of the analyzed emotion between the users. The supervisor may observe the output visually after each session, during the session and historical analysis of all the previous sessions and interpret, analyze, advise, change strategy for training, detect abnormality in behavior etc. HEART 100 may be used by variety of individuals. The regular users while they are dating, chatting with other users, law enforcements, detectives, national security, mental health physicians and not limited to these examples. Dating services may use this model as a paid system to get better results in finding a suitable significant other.

HEART system 114 may be hosted in middleware servers that can be accessed by a network or individual machine processors 102. The middleware server may be stand alone, cloud based or on any hosted services.

The display on user hardware such as a computer may be scalable. For example: a user may just have access to routine use for sessions such as chat, video, audio and combination thereof with other users as shown for user 106. The HEART system 114 may be hosted in the hardware of use or may be hosted in the server that they use for network 110. Another user may have an option to select the display of graphical output created as a result of using human emotion assessment system 114 as shown in user 103. The user in this case is enabled in near real time to observe the reaction of the other user for a minute chat, 5-10 frames of video and audio content is pitch analyzed, frequency analyzed and filtered for identification of sign 601 for a particular session. The user 103 may or may not be able to view the historical analysis of previous sessions. This helps the individual to gauge the reaction of their interaction with other user(s) and helps them modify or deduce the outcome. This may be a great tool for marketing individuals, sales, dating service providers and regular user to communicate effectively.

In another embodiment, as shown for user 112, they may be able to observe the outcome for between two users simultaneously. The security personnel, supervisors of marketing personnel, law enforcement personnel, medical professionals etc., may use this tool to diagnose, intercept, deduce human emotion based on output from HEART system 114. Since the outcome is in near real time and historical analysis is enabled, professionals from various walks of life may be able to understand and react to the needs of the individual immediately instead of after the fact situations. The supervisor and professionals may also be able to guide in near real time and benefit from immediate feedback.

Figure 2:
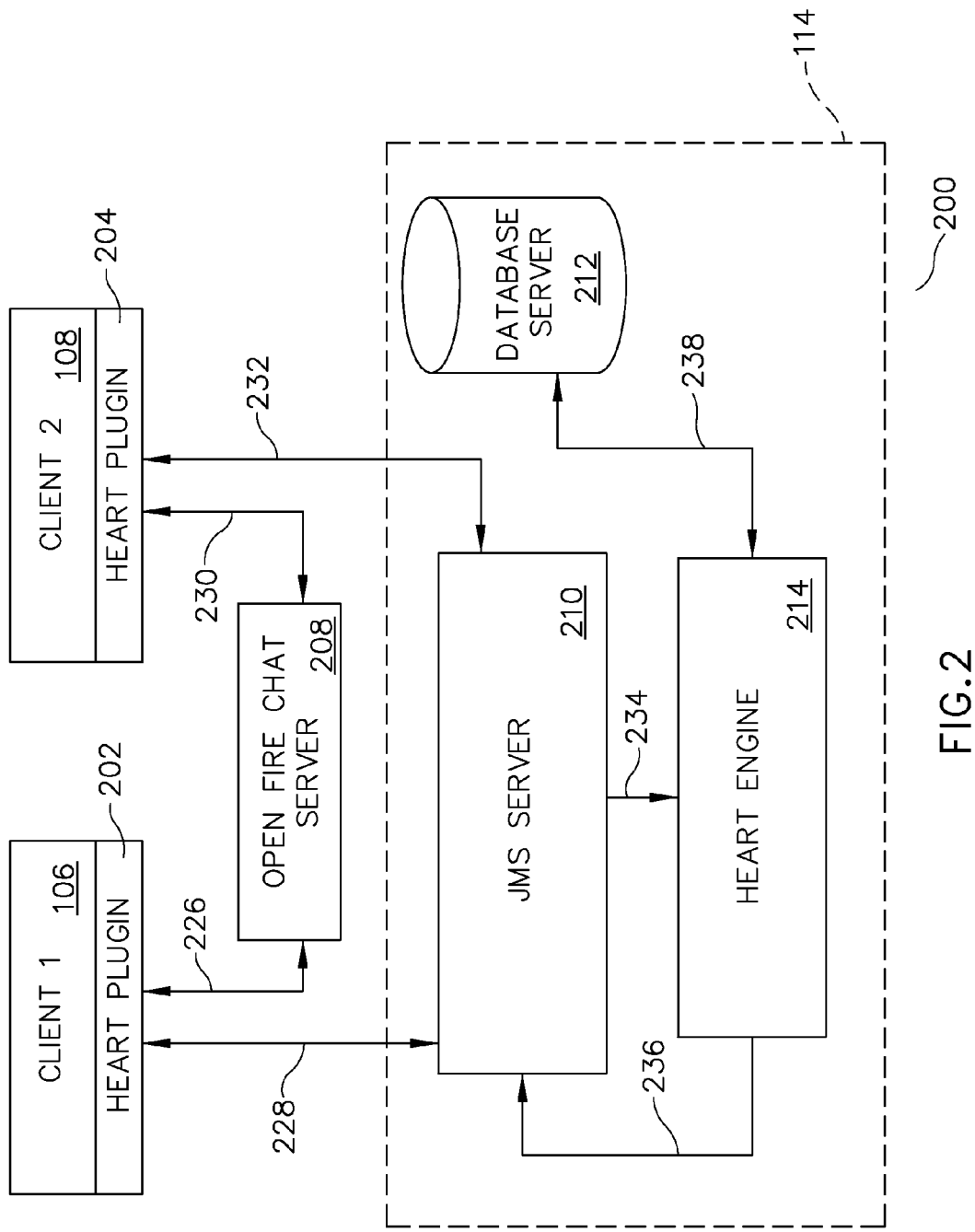
FIG. 2 illustrates an exploded view 200 of the human emotion assessment reporting technology (HEART) system 114, according to one embodiment.

FIG. 2 illustrates an exploded view 200 of the HEART system 114, along with open fire chat server 208 and client 106 and 108, according to one embodiment. In one embodiment, a human emotion assessment system 114 may allow connectivity to a user 110-N through a network 110. The user may have several types of devices such as an electronic book, mobile device, phone, computer, video game console, and PDA (Portable Digital Assistant), etc. The HEART system may be installed as a plugin 202 in user/client 106 and client 108 plugin as 204. Open fire chat server 208 enables client 106 to use 226 path to communicate and start a session with client 108 using path 230. HEART plugin 202 and 204 communicate with Java messaging server (JMS) 210 using path 228 for client 106 and path 232 for user 108. All these are bidirectional communication channels. HEART system 114 comprises of JMS server 210, database server 212 and HEART engine 214. The entire HEART system 114 may be housed on a remote server or in a processor 102 in device used by the user.

The database server 212 contains words listed from various word lists populated using Seekingwords, LIWCwords, Forrestwords, Wordnetwords, Bodywords, Legalwords, Ridwords, Buddhawords, Interjections, Rogetwords and Layergarywords and not just limited to these word list sources. Database server also contains all the data gathered by using various algorithms and helps build data for the historical analysis. The database server also works in conjunction with Natural language processing parser.

TABLE 1

The following table is just an example of one of the dictionaries LIWC being used:

| DIMENSION | ABBREV. | EXAMPLES | # WORDS |
|---|---|---|---|
| I. STANDARD LINGUISTIC DIMENSIONS ||||
| Total function words | Funct | | 464 |
| Total pronouns | Pronoun | I, them, itself | 116 |
| Personal pronouns | Ppron | I, them, her | 70 |
| 1st person singular | I | I, me, mine | 12 |
| 1st person plural | We | we, our, us | 12 |
| 2nd person | You | you, your, thou | 20 |
| 3rd person singular | She he | she, her, him | 17 |
| 3rd person plural | They | they, their, they'd | 10 |
| Impersonal pronouns | Ipron | It, its's those | 46 |
| Articles | Article | a, an, the | 3 |
| Verbs | Verb | walk, went, see | 383 |
| Auxiliary verbs | Auxverb | Am, will, have | 144 |
| Past tense | Past | walked, were, had | 145 |
| Present tense | Present | Is, does, hear | 169 |
| Future tense | Future | will, gonna | 48 |
| Adverbs | Adverbs | very, really, qucikly | 69 |
| Prepositions | Preps | to, with, above | 60 |
| Conjunctions | Conj | and, but, whereas | 28 |
| Negations | Negate | no, never, not | 57 |
| Quantifiers | Quant | few, many, much | 89 |
| Numbers | Number | one, thirty, million | 34 |
| Swear words | Swear | dumb, stupid, moron | 53 |
| II. PSYCHOLOGICAL PROCESSES ||||
| Social Processes | Social | talk, us, friend | 455 |
| Friends | Friends | pal, buddy, coworker | 37 |
| Family | Family | mom, brother, cousin | 64 |
| Humans | Humans | boy, woman, group | 61 |
| Affective Processes | Affect | happy, ugly, bitter | 915 |
| Positive Emotions | Posemo | happy, pretty, good | 405 |
| Negative Emotions | Negemo | hate, worthless, enemy | 499 |
| Anxiety | Anx | nervous, afraid, tense | 91 |
| Anger | Anger | hate, kill, pissed | 184 |
| Sadness | Sad | grief, cry, sad | 101 |
| Cognitive Processes | Cogmech | cause, know, ought | 730 |
| Insight | Insight | think, know, consider | 195 |
| Causation | Cause | because, effect, hence | 108 |
| Discrepancy | Discrep | should, would, could | 76 |
| Tentative | Tentat | maybe, perhaps, guess | 155 |
| Certainty | Certain | always, never | 83 |
| Inhibition | Inhib | block, constrain | 111 |
| Inclusive | Incl | with, and, include | 18 |
| Exclusive | Excl | but, except, without | 17 |
| Perceptual Processes | Percept | see, touch, listen | 273 |
| Seeing | See | view, saw, look | 72 |
| Hearing | Hear | heard, listen, sound | 51 |
| Feeling | Feel | touch, hold, felt | 75 |
| Biological Processes | Bio | eat, blood, pain | 567 |
| Body | Body | ache, heart, cough | 180 |
| Health | Health | clinic, flu, pill | 236 |
| Sexuality | Sexual | horny, love, incest | 96 |
| Ingestion | Ingest | eat, swallow, taste | 111 |
| Relativity | Relativ | area, bend, exit, stop | 638 |
| Motion | Motion | walk, move, go | 168 |
| Space | Space | Down, in, thin | 220 |
| Time | Time | hour, day, oclock | 239 |
| III. PERSONAL CONCERNS ||||

TABLE 1-continued

The following table is just an example of
one of the dictionaries LIWC being used:

| DIMENSION | ABBREV. | EXAMPLES | # WORDS |
|---|---|---|---|
| Work | Work | work, class, boss | 327 |
| Achievement | Achieve | try, goal, win | 186 |
| Leisure | Leisure | house, TV, music | 229 |
| Home | Home | house, kitchen, lawn | 93 |
| Money | Money | audit, cash, owe | 173 |
| Religion | Relig | altar, church, mosque | 159 |
| Death | Death | bury, coffin, kill | 62 |
| IV. SPOKEN CATEGORIES | | | |
| Assent | Assent | agree, OK, yes | 30 |
| Nonfluencies Fillers | Nonfl | uh, rrX | 8 |

The HEART engine 214 comprises of algorithms that perform the analysis of text based chat sessions using single value decomposition algorithm, principal component analysis (PCA) and hierarchical slope clustering. All the algorithms are applied to the data produced by n×11 tables. The video data is analyzed by sampling 5-10 frames per second. More frames and more data can be analyzed if one has a bigger processor. The current limitation is only used for demonstrating that it can be used in any computer that is available in the market today. Feature extraction, motion analysis and growth and decay analysis is performed. Cluster analysis on the above mentioned data is performed and subsequently sign analysis is done and data stored in database. In this instant only sign analysis is equivalent to semiotic analysis.

If the session is an audio session then pitch analysis, frequency analysis and filtering techniques are performed to identify the sign value and interpretation of sign value is done to display results.

Figure 3:
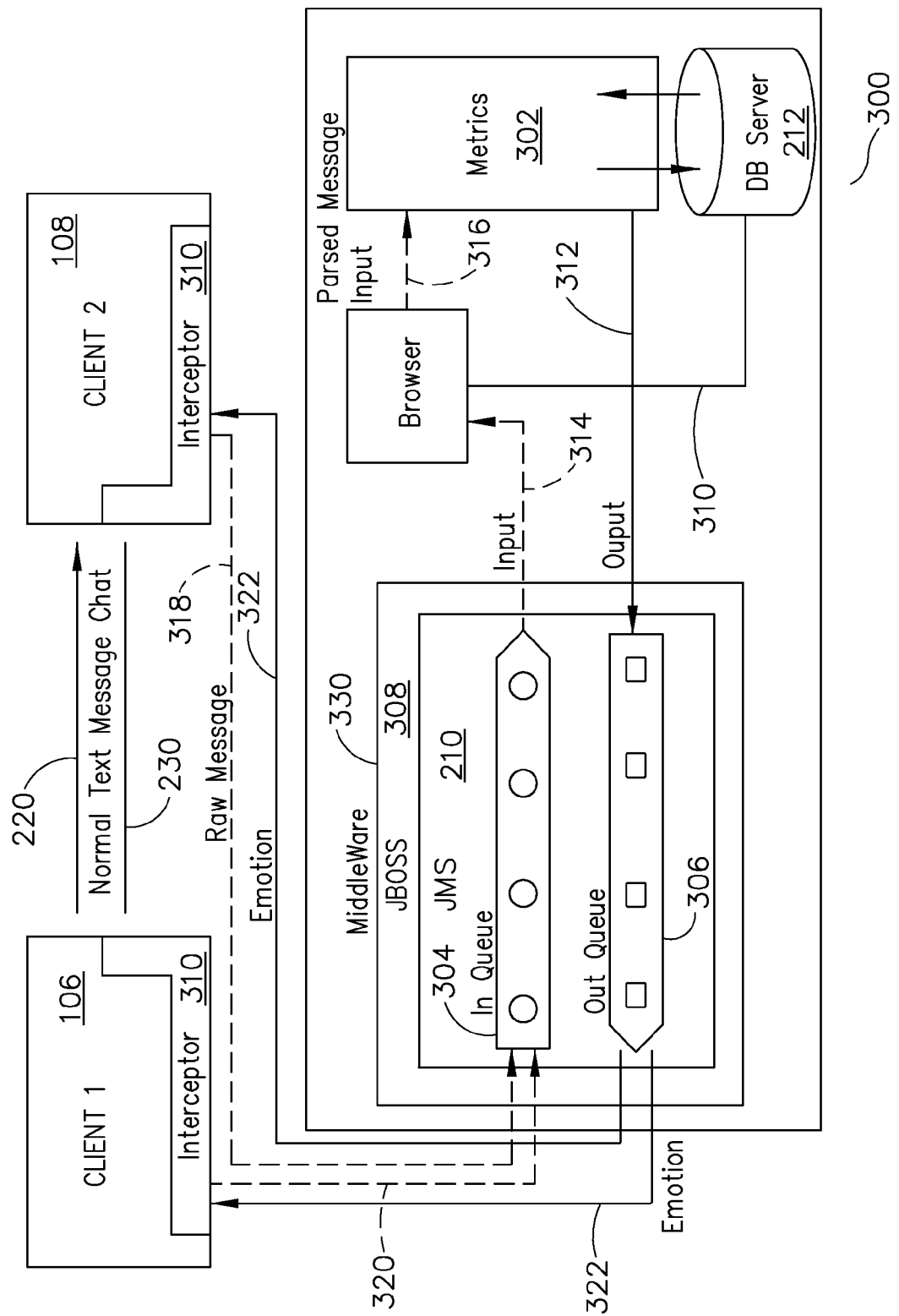
FIG. 3 shows a detailed architecture than FIG. 2 for human emotion assessment reporting technology (HEART) system 114, according to one embodiment.

FIG. 3 shows a detailed architecture than FIG. 2 and data flow for HEART system 114. Client 106 and client 108 are having a normal chat session 220 and 230 with each other. The interceptor 310 housed in both the clients hardware send messages such as real time input (parsed message) 318 and 320 to the Middleware 330. JBOSS 308 and JMS 210 reside in the middleware 330. The raw messages 318 and 320 are in queue 304 and serve as input 314 to a browser 324 that may house natural language processing unit to provide parsed message input 316 to the metrics table 302. Metrics table 302 stores the output into a database server 212. The metrics table 302 also provides output 312 to out queue 306 in the JMS 210. The client/user 106 and 108 receive the output as expressed emotion 322 in real time or near real time. Real time may be described as one or two minute lag time between the start of the session and the expressed emotion 322 feedback. The near real time may be described as between two minutes and three minutes due to server capacity delay or the amount of traffic on the network 110.

Figure 4:
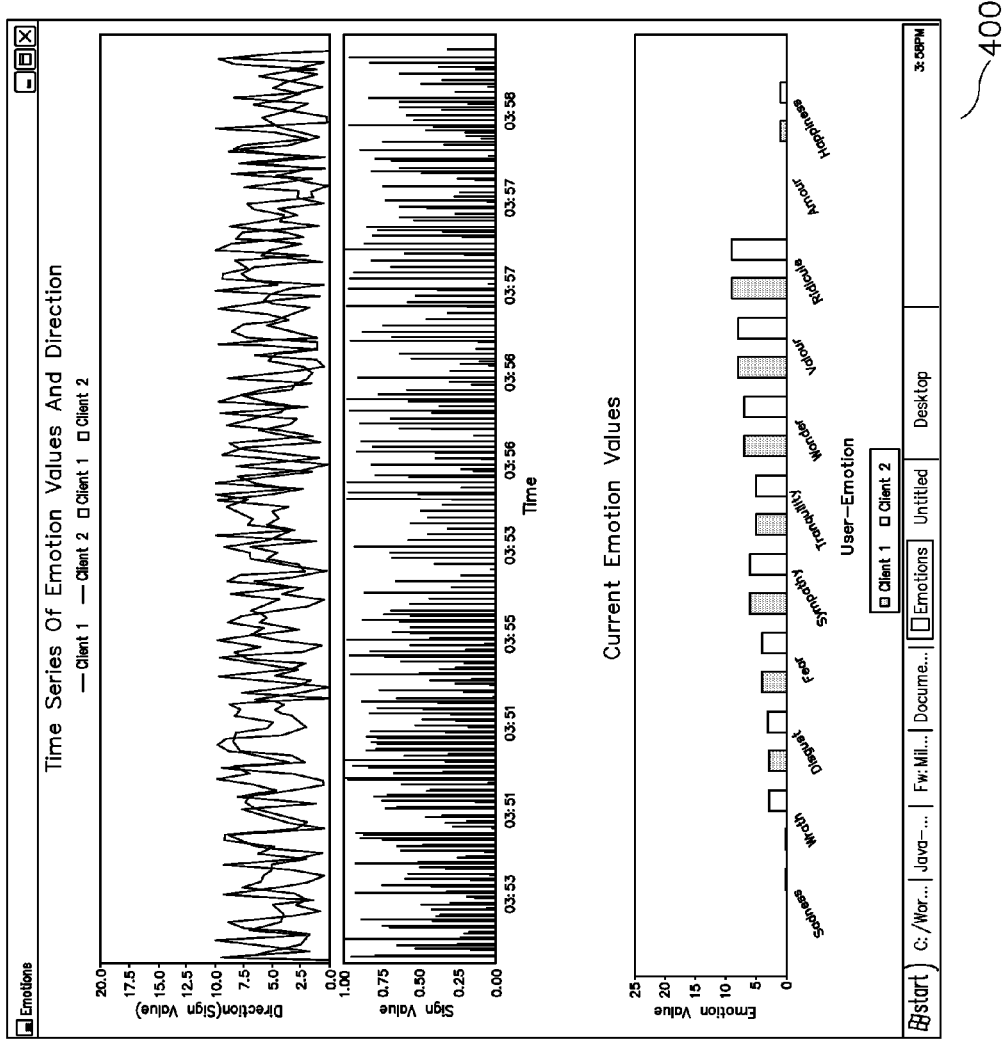
FIG. 4 shows the graphical output of the emotion 400, according to one embodiment.

FIG. 4 shows the graphical output of the emotion 400. The graphical output 400 of the instant invention is a result of many algorithms that helps keep track of emotions over space and time and establish correlations and learn the human behavior. This analysis is useful for the following activities but just not limited to them:

Analyze Human emotion during online chat process, conference calls, meetings

Establish the interaction characteristics, relationships of humans, group dynamics, group interaction Helps dating, marriage leads, corporate chat and business perspectives, study about sales representatives and customers interactions Analyze political scenario of a country (Eg. Revolution in Egypt, analyzing online chat will indicate any sign of threat for National Security)

Health industry doctor/patient interaction through email and online chat, Psychiatric analysis Proxy to measure human daily activities, financial situations and critical important upcoming family, national and global events Human emotions induce humans to buy/sell any commodities, visit to shopping malls etc.

Mobile chat/text will address the indirect impact of local economy

Department of Transportation/Security/Defense—Detect any sign of threat to any infrastructure As shown in the FIG. 4 there true emotions such as sadness wrath, disgust, fear, sympathy, tranquility, wonder, valor, ridicule, amour and happiness are depicted between two user chat sessions. The instant application assigns a value for each emotion as shown below:

TABLE 2

| The range is from Sad to Happy. | | | | | | | | | | |
|---|---|---|---|---|---|---|---|---|---|---|
| Sad | Wrath | Disgust | Fear | Sympathy | Tranquility | Wonder | Valor | Ridicule | Amour | Happy |
| −5 | −4 | −3 | −2 | −1 | 0 | 1 | 2 | 3 | 4 | 5 |

The output of this HEART is designed to quantify human emotions. The human emotions can be mapped to a spectrum or an emotion scale called 'Navarasam'. Nava means nine and Rasam means palette of emotions which together represents the variation of human emotions between sad and happy. Navarasam Scale is the Emotion scale range starts from −5 (Sad) to +5 (Happy). There are 10 emotion intervals in the instant description. Initially the intervals are classified as discrete and quantifiable value is assigned for each category instead of intervals. Between the intervals there exists emotion fuzziness, which may also be taken into account to compute sign and signifier (interpretation). The negative categories represent sadness and positive categories represent happiness. Neutral category represents tranquility, peace and stability which are represented by zero. Sign in the present case is only human emotion. Each sentence when a human is writing emotion is embedded in that particular script. Why are we doing sign extraction? Human emotion value is extracted using semiotic analysis. The normal syntactic and semantic extraction and the added semiotic analysis that extracts the sign value to predict the human behavior. Sign in this application is directly related to human emotion and just features.

The first segment of our analysis works with semiotic analysis of text. We have developed a working end-to-end prototype for near real time analysis of human emotions during live chat. This algorithm has been tested with individual participants during online text chat sessions. The emotions of the participants are represented in emo-meter (Histogram/Line chart) for participants response based on semiotic concepts, which identifies the sign of emotion and direction of emotion or vector of emotion. This also calculates the current emotional state of participants and the corresponding model can be used to predict the future emotion values and the correlation between the emotional states of chat/video/audio/combination thereof of participants.

Figure 5:
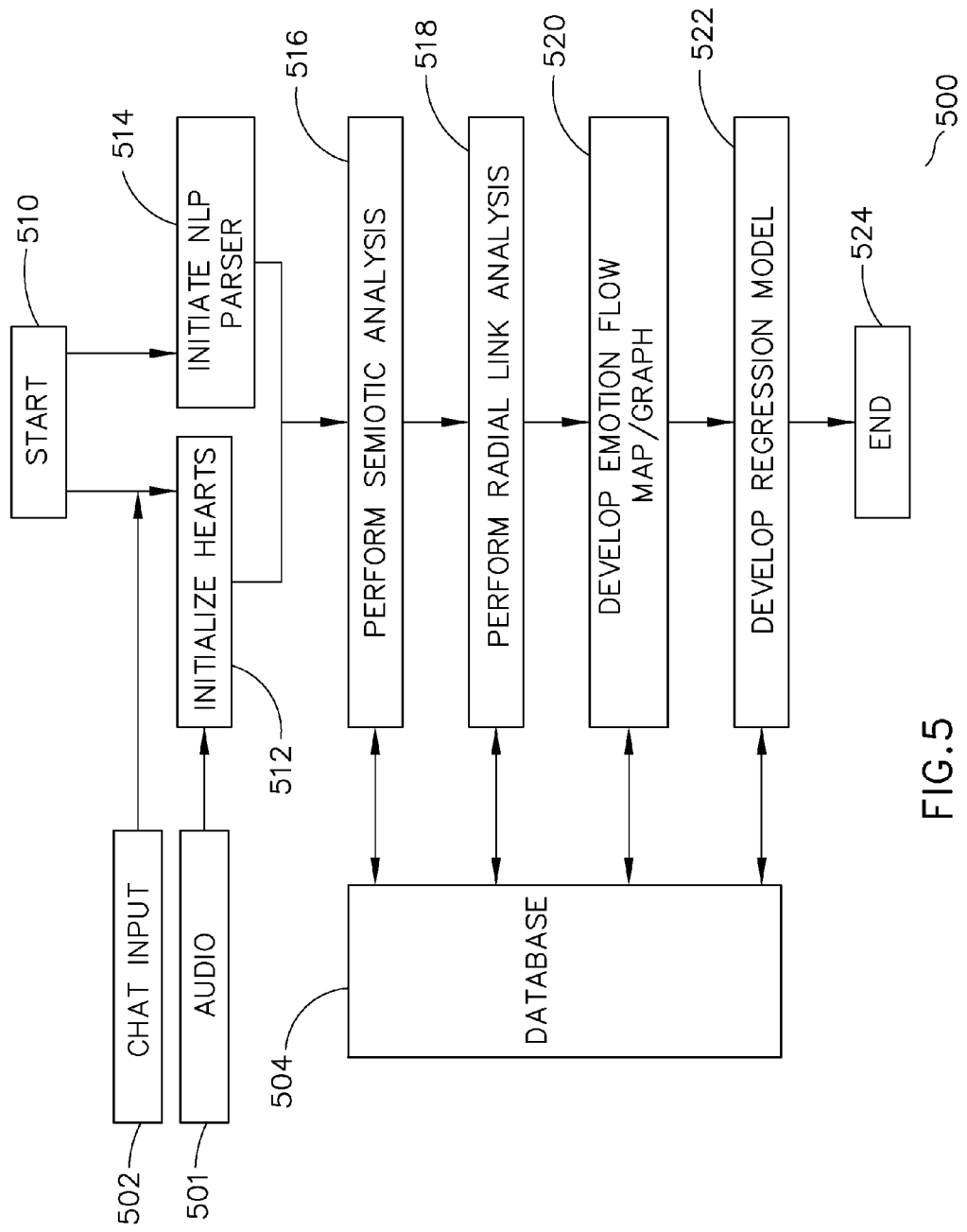
FIG. 5 shows a method of performing the human emotion analysis 500 using the HEART, according to one embodiment.

FIG. 5 shows a method of performing the text session analysis 500 using the HEART. Once a session for chat/video/audio/combination thereof has started 510 the audio 501 is directly sent to initialize the HEART system 512. Chat and video input is also captured 502 and used to initialize HEART system 512. Simultaneously natural language processing server 514 is also initialized. Semiotic analysis is performed 516 using the input from the session and NLP server inputs. The data obtained after performing semiotic analysis 516 is used for performing radial link analysis 518.

Radial Link Analysis 518 is done as follows: Step 1: Select a keyword or set of keywords, which can represent name, place, time, theme or an idea. Step 2: Emotion value for each minute of a given emotion based on text, audio and video are stored in the database. One can use the selected keywords from step 1 and search the database and identify the Emotion value for that minute. Each emotion value is associated with time and location of the session. The user can apply any constraints to narrow down the database search. Step 3: The results of the database search will yield interrelationship based on the emotion value time series of the chat sessions. Compute the difference between Max-Min of the emotion value of a given chat and that will form the distance of that node from the root node of the radial link analysis. The radial link analysis will provide the themes/keyword representation for the historical analysis.

The data from radial link analysis 518 provides results to be displayed and developed as emotion flow map or graph 520. Developing regression model 522 on the data used for creating a graph or map is done. Regression models have been adopted for this processing because they are very easy to calibrate the intervals of the data with minimum amount of data. Statistical intervals for predictions are robust enough to optimize the model characteristics. The output data from semiotic analysis 516, radial link analysis 520, graph as output 520 and regression model 522 are all stored in database 504 in real time. The method then ends 524 after regression analysis 522. It restarts once a session is restarted. Some of the examples for using human analysis of emotion may be used for depression analysis, prison parole behavior analysis, war veterans monitoring, airport Screening, insurance fraud analysis, flight accident investigation based on pilot report, dating service and marriage related sessions.

Audio analysis is done as follows: Low, Medium and High Frequency analysis are carried out at the raw audio signal to understand the frequency of the unique signal which is embedded in the noisy audio. This analysis will provide an insight into the high-level human emotion, but not useful to extract emotion sign. The Haar wavelet transform will allow the extraction of signs based on various power. Haar Wavelet Transform: The power is 64, 128, 256, 512, 1024 or 2048 to estimate the frequency using Haar Wavelet transform. Daubechies: The power used is 4096, which will enable to find the human emotion in the angry state. All these audio analysis is useful to extract the human emotion which is expressed in 11 states.

Currently we are adding technological advancement by applying the semiotic analysis to extract human emotion value on top of syntactic and semantic analysis that already exists.

Figure 6:
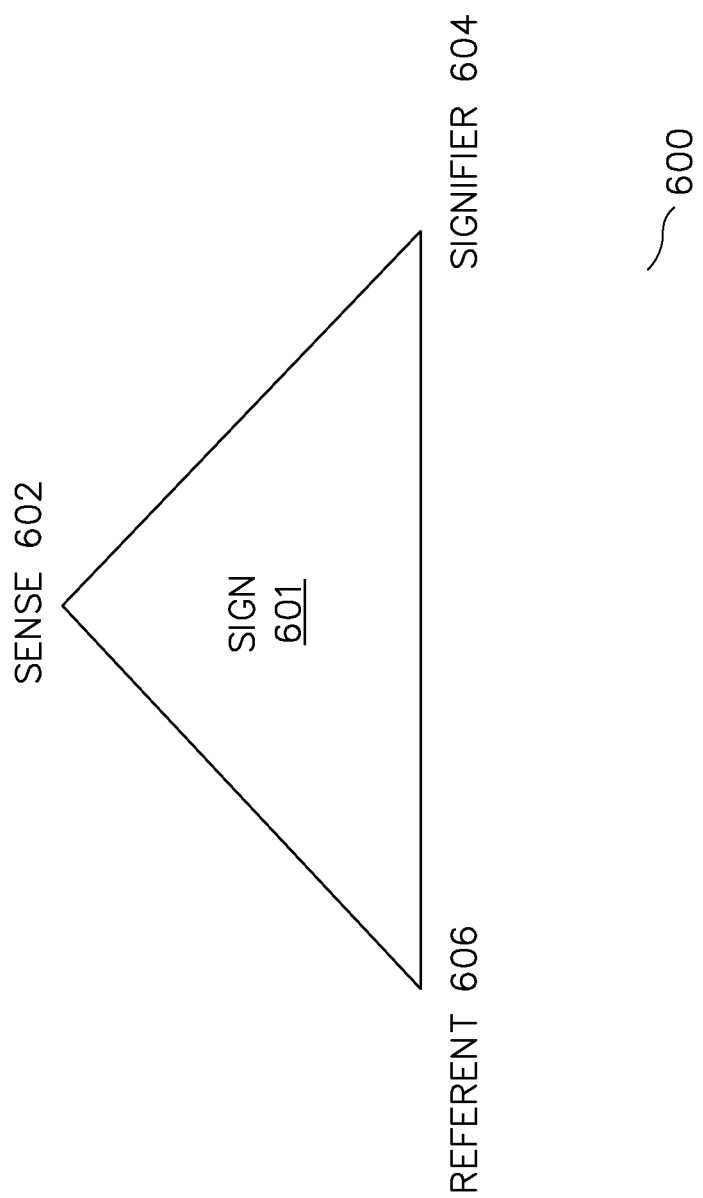
FIG. 6 shows an expanded view of the semiotic analysis 600 in an expanded view, according to one embodiment.

FIG. 6 shows an expanded view of the semiotic analysis 600 in an expanded view. In Semiotic analysis 600, the sign will be decoded into sense 602, signifier 604, and referent 606 (result interpretation/signified). Semiotic analysis according to Leonid I. Perlovksy (2006) describes the mathematical nature of signs and symbols. In the instant application a sign is calculation of three important parts, sense, signifier and referent. Semiotics studies signs and symbols, which are generally understood as entities designating some other entities in the world or in the mind (Leonid I. Perlovksy (2006)). The signifier 604 and sense 602 are provided using Singular Value Decomposition and Principal Component Analysis. The extraction of sense 602 and signifier 604 is done by implementing of the algorithm (SVD 606, HSC 610 and PCA 608) works real time and parses text during a live chat session. Each user as responder and user as sender has multiple sentences in a response. Each sentence is parsed into tokens. Based on the Emotion dictionary, each sentence will be decoded into n×11 matrices. If there are multiple responses, it will be added to the existing matrix. Within a minute there are multiple sentences and responses, each minute response is appended to a matrix A. Each minute response is decomposed using Singular Value decomposition 606 to identify the emotion sign 612 sign for the given minute which is done using HEART.

The singular values decomposition of a matrix A is the factorization of A into the product of three matrices $A=UDV^T$ where the columns of U and V are orthonormal and the matrix D is diagonal with positive real entries. The diagonal entries D are known as the singular values of A. The singular values of double array represent the consolidated human emotion for a given minute. Algorithms that may be used as an alternative to SVD are Eigen Value Decomposition, QR Decomposition, LQ Decomposition and Cholesky decomposition.

Principal component analysis (PCA) is a mathematical procedure that uses an orthogonal transformation to convert a set of observations of possibly correlated variables into a set of values of linearly uncorrelated variables called principal components. The number of principal components is less than or equal to the number of original variables. This transformation is defined in such a way that the first principal component has the largest possible variance (that is, accounts for as much of the variability in the data as possible), and each succeeding component in turn has the highest variance possible under the constraint that it be orthogonal to (i.e., uncorrelated with) the preceding components. The first principal component's Emotion Vector is considered as the Feature vector of emotion which indicates the direction of progression of human emotion within Navarasam scale. Algorithms that may be used as an alternative to PCA are Regression Analysis, Canonical Correlation Analysis, Principal Component Regression and Multivariate Analysis.

The referent or interpretation is computed based on the following algorithm: For each line/response, the values are decoded into emotion counts based on the emotion dictionary. If all the values are zero, then the response is not considered. If only one value is available, the point is considered until rest of the data is collected. In a given response, if more than one category count is available, slope of the responses is computed. Earlier points which are available in cache will be assigned based on the shortest distance between the nearest lines. Once the points are assigned by the nearest distance to the lines and the slope of the lines indicate the resultant emotion. The lines and the points are aggregated/clustered based on the line slope and the distance between the start and end points of the line segments. The distance between the line segments will yield the result of the human emotion during the entire chat session. The slope hierarchical clustering is extremely fast and robust to accomplish the speed of the chatting and it adjusts as new points are generated. It is done as follows:

Obtain SVD values for given minute from n×11 rows.

If only one sign value is available, store it in list of points used later in computation.

If two or more non-zero values are available, find the slope using best-fit (maximum) distance between points. Also calculate the length of the segment.

Check each point from list from above step and find the nearest line available to the point every time a new line is added. The nearest line is calculated using the perpendicular distance between a point and a line.

All points should be associated with the nearest line. A line and its associated points are used in the same cluster in computation.

Check negative, positive, zero or indefinite slope. Based on the slope values, assign the lines to the corresponding cluster.

Initially start with four clusters based on the sign value of the slope.

Repeat all the above steps for the entire chat session.

Within each hierarchical cluster, generate a dendrogram based on the segment length and the distance between the lines in the cluster.

More points and lines in the negative slope suggest that the chat session is progressing from "SAD" to "HAPPY" state. The reverse is true for a positive slope suggesting a progression from "HAPPY" to "SAD" state.

Pseudo code for the steps:

```
Initialize list(points)
Initialize list(lines(slope, segment length))
Initially four clusters based on the sign value of the slope: negative, positive, zero or
indefinite slope.
Initialize minuteCount =0
repeat
    repeat
        Get 1 X 11 matrix from the result of SVD computation for 1 minute data
        if (num non-zero values equals 1)
            Add to list(points)
            Calculate perpendicular distance to all lines in list(lines(slope, segment
            length)
            Associate point to line with min(calculated distances)
        else
            Calculate slope, segment length using best-fit(Maximum distance) of all
            non-zero values
            Add to list(lines(slope, segment length))
            Calculate perpendicular distance from all points in list(points)
            Associate any point to this line with min(calculated distances) is from this
            line
            Assign this line and associated points to one of the four clusters depending
            on its slope value.
        minuteCount = minuteCount +1
    until minuteCount < 15(We are sampling 15 mins data here)
        Within each hierarchical cluster, generate a dendrogram based on the segment
        length and the distance between the lines in the cluster.
    Reset list(points)
    Reset list(lines(slope, segment length))
    Reset four clusters based on the sign value of the slope: negative, positive, zero or
    indefinite slope.
    Reset minuteCount =0
until chat session is terminated
```

The above three steps being applied in such order is a significant procedure. These steps formulate the fundamental atomic representation of semiotics. In most cases text, audio or video, or a combination thereof, will be transformed to a size less than a 60×11 matrix. SVD is applied to decompose 60×11 matrix to 1×11 matrix as a single representation of emotion sign for a minute. The emotion sign is appended to the following minutes of n×11 and SVD and PCA are applied. SVD yields sign for the minute and PCA's first principal component provides the emotion vector for a given minute. Hierarchical Slope Clustering (HSC) displays the human emotion referent and its computation of the hierarchical clustering mechanism of the emotions.

Figure 7:
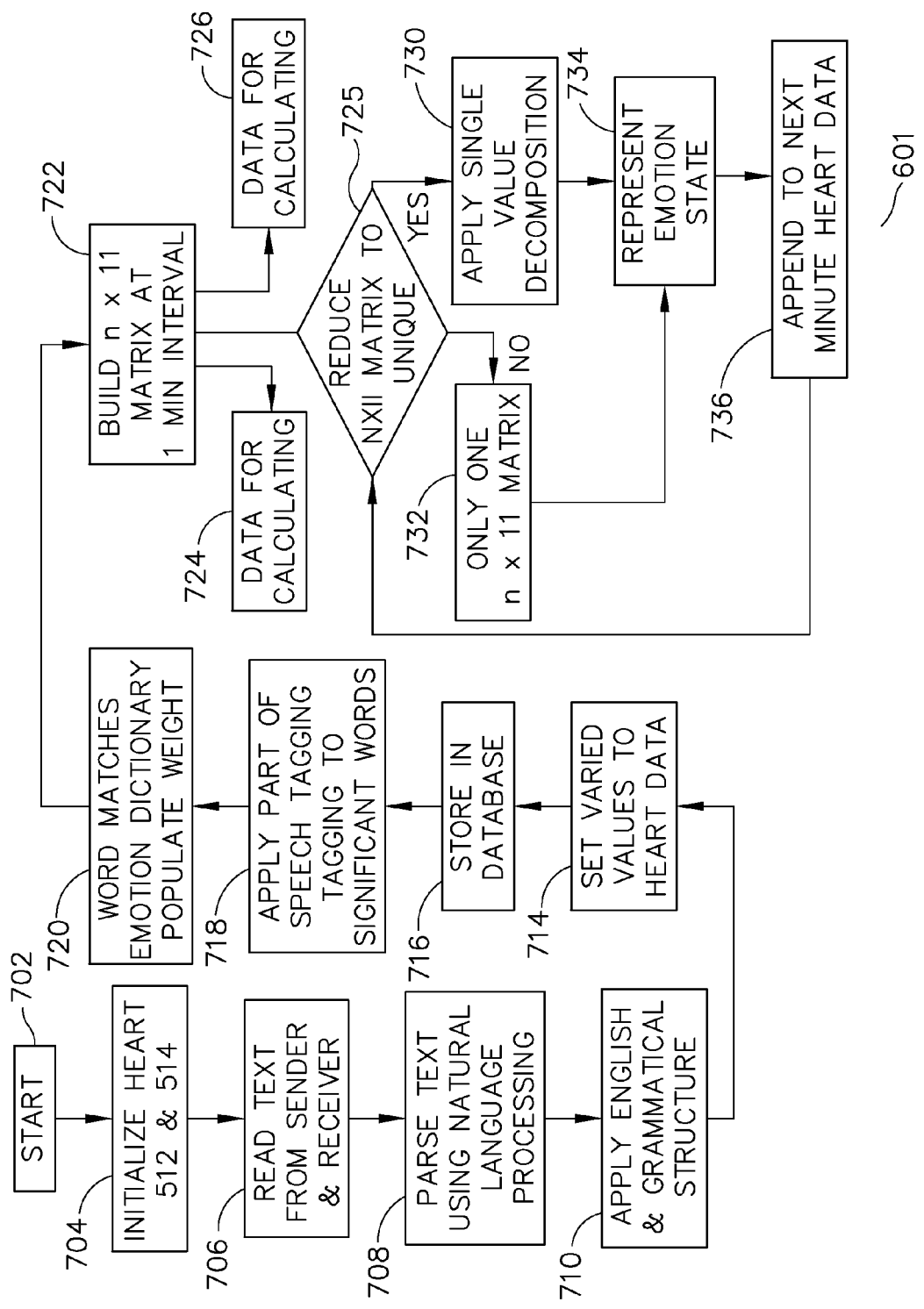
FIG. 7 shows the method of performing the sign identification 601 in detail, according to one embodiment.

FIG. 7 shows the method of performing the sign identification 601 in detail. The sign identification 601 starts 702 when the user chat session starts for example. Initialization of HEART 512 and initialization of NLP server 514 happens in step 704. The processor based algorithm then reads the text from first user and the response from the second user and vice-versa in step 706. Parsing of the text is done using natural language processing at step 708. Step 710 is performed to apply English grammatical structure to the parsed text. After step 710 the values are set to the HEART engine data at step 714. The values for a given data that are set are the 5 W's and 1 H. The 5 W's for the data are who, whom, what, when, where and why, 1 H is how. All the formatted data is stored in the database in step 716. The parts of speech are tagged for significant words in step 718. Parts of speech tagging is applied to significant words such as noun, adverb, adjective and verbs. If a match is found in the emotion dictionary then the n×11 weight matrix is populated.

The Emotion Dictionary is the heart of the algorithm and HEART engine and system. The dictionary comprises of a list of words gathered from various sources and categorized to be utilized by the core algorithm used for the semiotic analysis. There are 217 emotion categories which represents Navarasam of human emotions wherein the scale includes the range from happy to sad. The Sad categories are represented by 116 and happy categories are represented by 101. "SAD" emotion state is represented by 46 categories whereas Ridicule is represented by 3 categories. Each of the emotion categories have set of words with distinct weights computed. The distinct weight is computed based on the number of times the word has appeared in psychological research literature, which are considered while constructing the emotion dictionary. Weight for a specific emotion word=1+(# of times emotion category/# of words (231194)). At step 720 if the word matches the emotion dictionary a weight is populated for the word. n×11 matrix is built at one minute intervals for the next in step 722. Step 722 produces data for calculation of referent 606 and signifier 604 in step 724 and 726 respectively. n×11 matrix is reduced to unique value in step 728. If there is only one n×11 matrix then in step 732 it is sent to represent an emotional state in step 734. If there is more than one n×11 matrix then single value decomposition is applied in step 730 and then it is sent to represent an emotion in step 734. The emotion is graphically represented and also sent to append to HEART data in 736 to add to the baseline or looped back to reducing the n×11 matrix to unique value in step 728.

Figure 8:
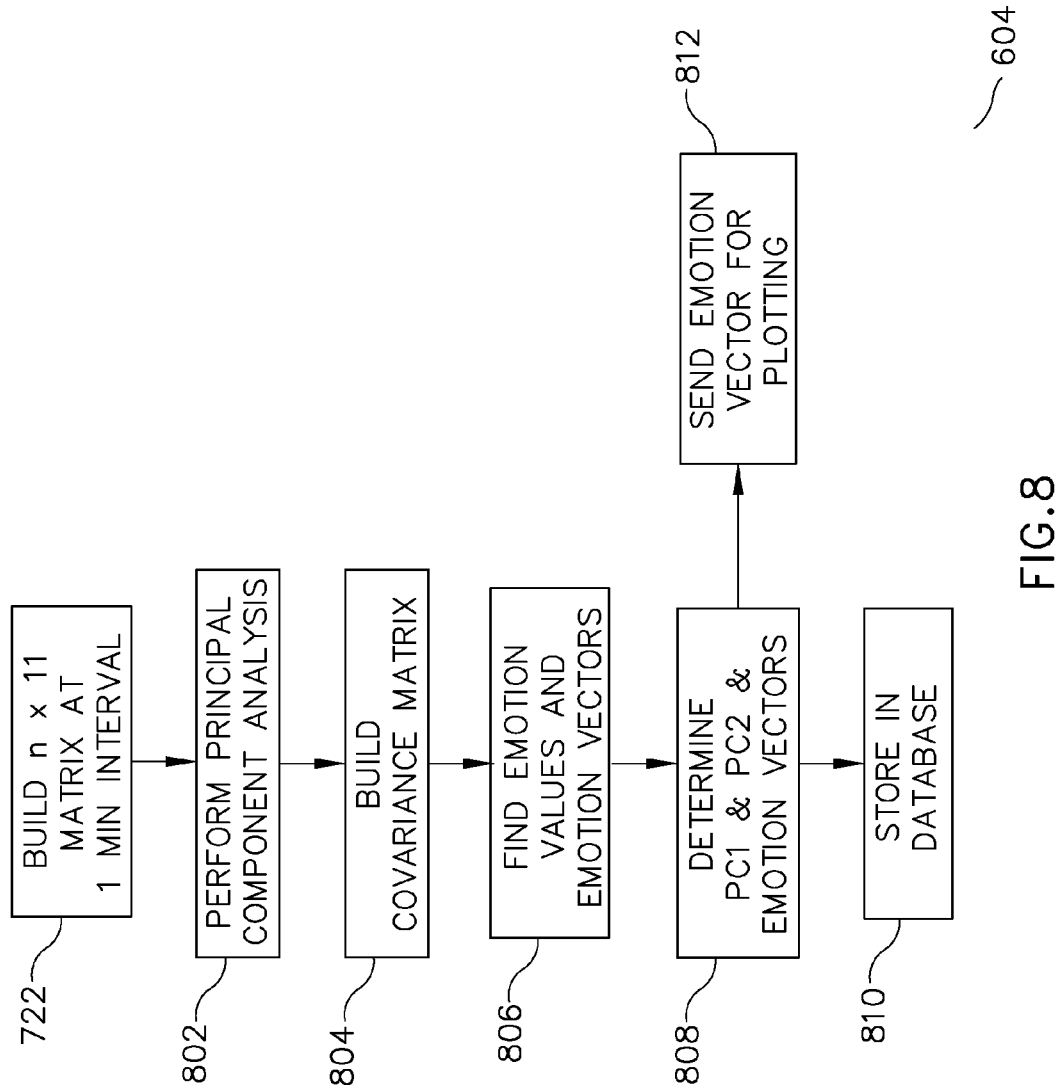
FIG. 8 shows the method of creating a signifier 604 value for completing the semiotic analysis, according to one embodiment.

FIG. 8 shows the method of creating a signifier 604 value for completing the semiotic analysis. After building the n×11 matrix in step 722 principal component analysis (PCA) is performed on the data in step 802. Principal Components Analysis (PCA) is a way of identifying patterns in data, and expressing the data in such a way as to highlight their similarities and differences. Since patterns in data can be hard to find in data of high dimension, where the luxury of graphical representation is not available, PCA is a powerful tool for analyzing data. The other main advantage of PCA is that once you have found these patterns in the data, and you compress the data, it can be reduced in the number of dimensions, without much loss of information. The output from the PCA step 802 a covariance matrix is built at step 804. As a next step Emotion value and Emotion vectors are found in step 806. A determination of principal component and Emotion vector is done for first user data and the second user data in step 808. The Emotion vector data produced from step 808 is sent for plotting in step 812. However the data produced at step 808 is also stored in the database at step 810.

Figure 9:
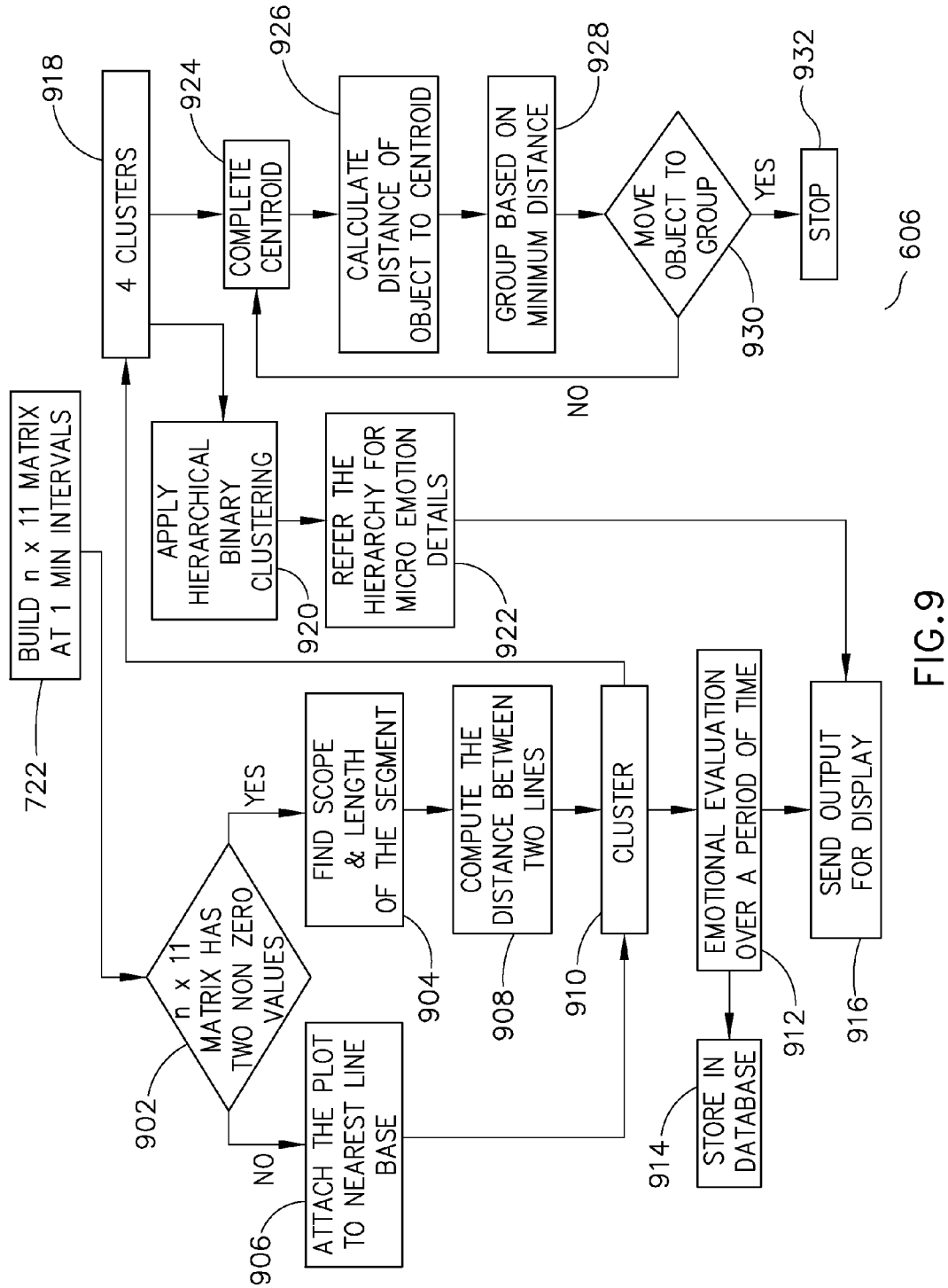
FIG. 9 is a method to produce referent data 606 for performing semiotic analysis, according to one embodiment.

FIG. 9 is a method to produce referent data 606 for performing semiotic analysis. The data from step 722 is evaluated for having two non-zero values in step 902. If the decision is yes then a slope and length of the segment is calculated in step 904. If the answer is no then the plot is attached to the nearest line base in step 906 and sent to clustering in step 910. After the slope and length is calculated in step 904 computation is performed to find the distance between the two lines in step 908. The data produced in step 908 is sent for clustering in step 910. Once there is a cluster of four as shown in step 918 hierarchical binary clustering is applied in step 920 and reference is made for the hierarchy for micro emotion details in step 922 and the resultant data is sent as output for display in step 916. Once the cluster is formed in step 910 emotional evaluation over a period of time is done in step 912 and the resultant data is sent for display in step 916. Another calculation is performed after step 918 is to complete the centroid at step 924. One calculates the distance of object to centroid in step 926 and a grouping is done based on mini distance at step 928. If the data is good enough to be moved as an object to the group the method is stopped 932. If the answer is no then the loop reverts back to completing the centroid formation in step 924.

Commonly used software uses syntactic and semantic analysis to extract human emotions. In this approach, a human has to interpret the emotions to find any behavioral changes. The instant invention implements a semiotic analysis approach. Semiotic analysis approach automatically provides the behavioral changes of any human response within a minute and captures the progression of human behavior during the communication session.

Figure 10:
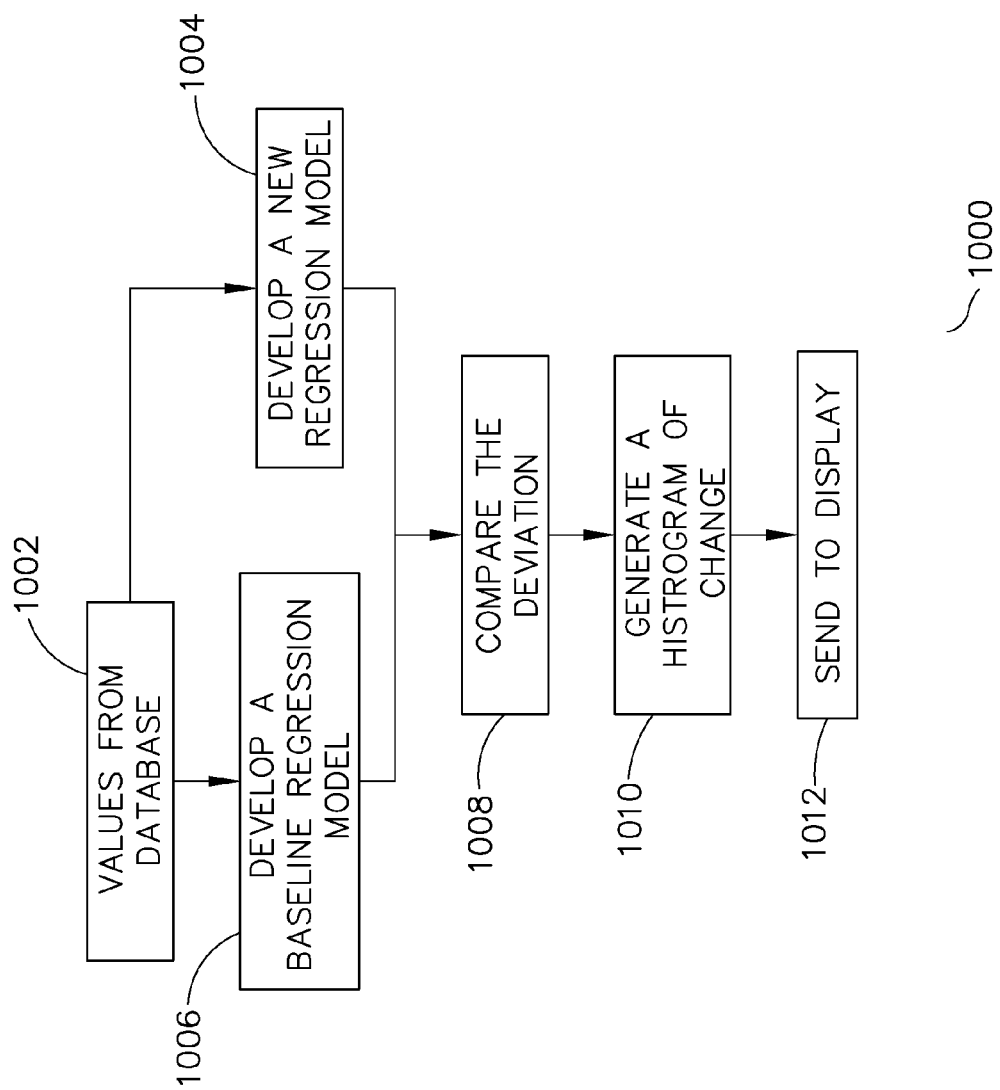
FIG. 10 shows the method of performing regression analysis 1000 for determining human emotion values, in one embodiment.

FIG. 10 shows the method of performing regression analysis 1000 for determining human emotion values. Stored and current database values 1002 are used in two ways for regression analysis. At step 1006 the baseline data is used to develop regression model. In step 1004 new data is used for crating regression model. A comparison of deviation in step 1008 is done for data produced in step 1006 and step 1004. Once the deviation is compared the output is used to generate a histogram in step 1010 to represent emotion change. The resultant data is sent to display in step 1012.

Figure 11:
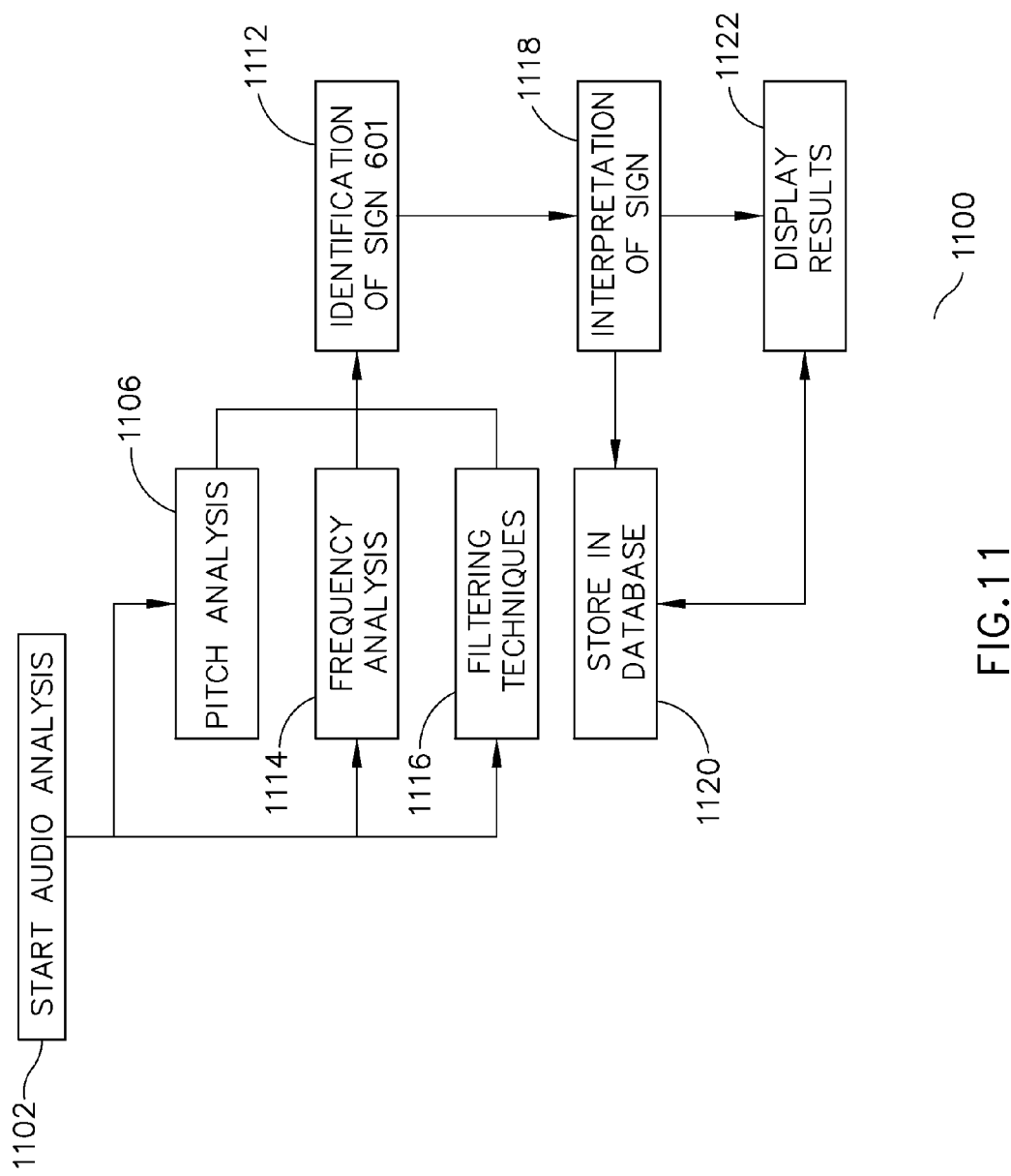
FIG. 11 shows a method to perform audio analysis 1100, in one embodiment.

FIG. 11 shows a method to perform audio analysis 1100. The same procedure can be performed as we do for text as described above. Once the session has started 1102 the speech is converted to text in step 1104 and the method described in FIG. 5 can be followed. In another embodiment, pitch analysis 1106 is performed for the audio file along with frequency analysis 1110 and filtering techniques 1116. The input from pitch analysis 1106, frequency analysis 1110 and filtering techniques 1116 is used for identification of sign 601 at step 1112. Subsequently interpretation of sign at step 1118 is performed. Once step 1118 is finished the results are stored in a database 1120 and the results are sent for display 1122.

Figure 12:
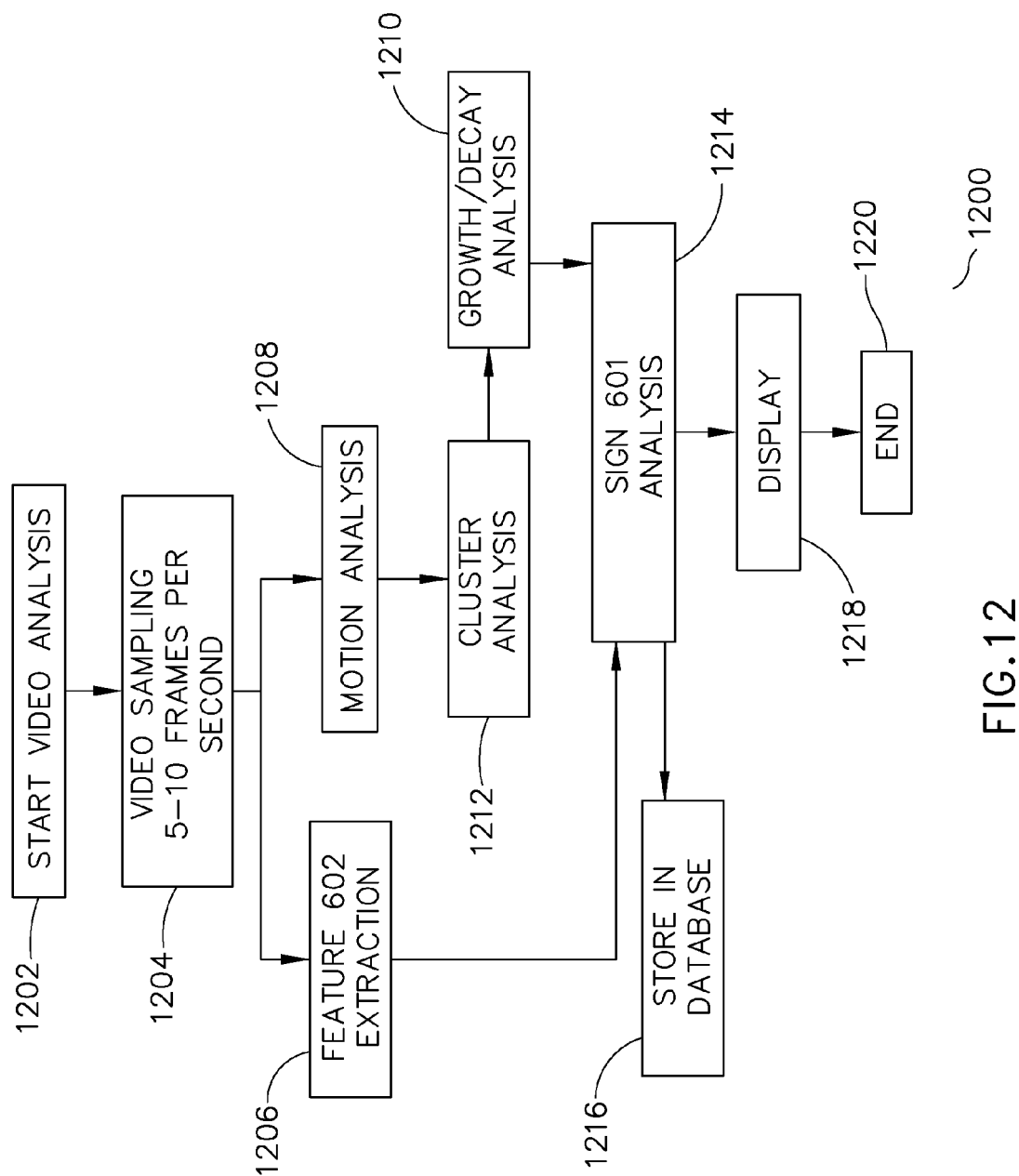
FIG. 12 shows the method of performing the video analysis 1200, in one embodiment.

FIG. 12 shows the method of performing the video analysis 1200. The video sampling is started 1202 and every 5-10 frames per second the sampling is done at step 1204. Sense 602 extraction algorithms are run at step 1206. The motion analysis for the video is performed at step 1208. Cluster analysis 1212 and growth and decay analysis 1210 is performed to obtain referent analysis 606 at step 1214. The results are stored in database at step 1216 and also the results are displayed at step 1218 before ending the analysis at 1220.

Figure 13:
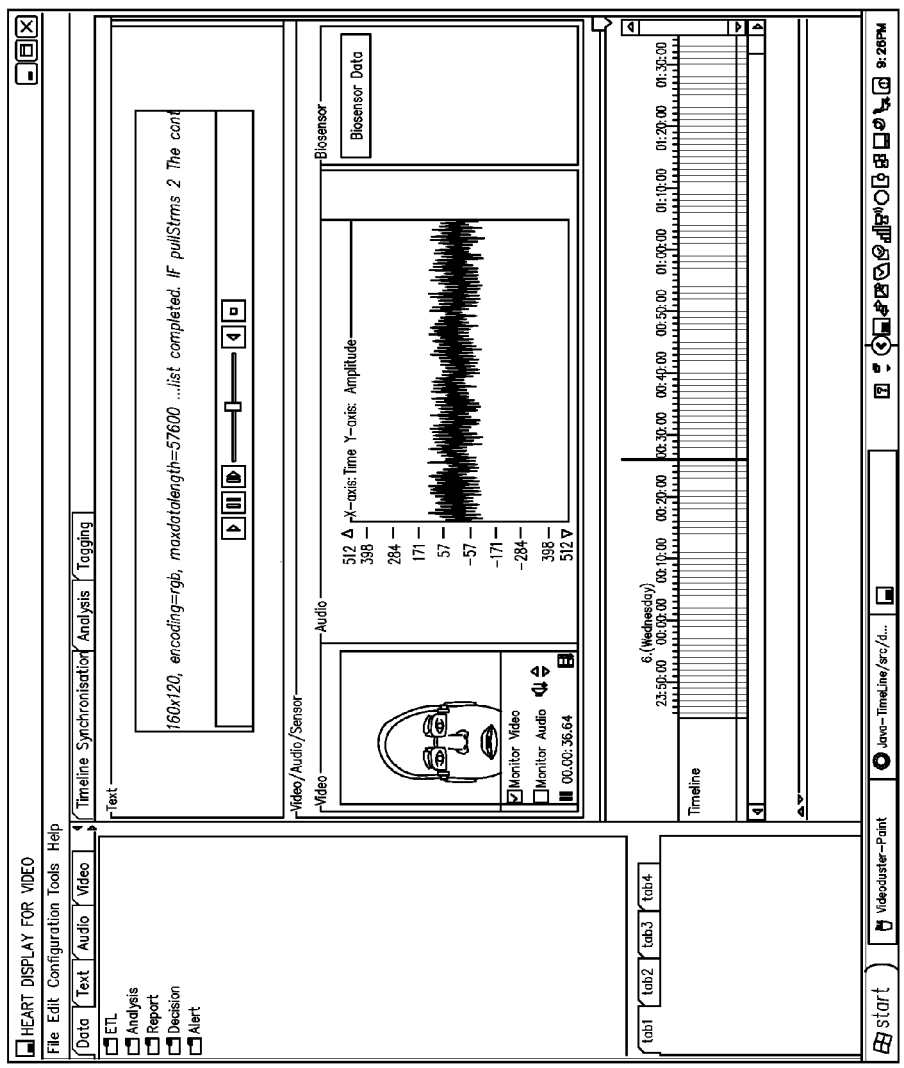
FIG. 13 is a screen shot of the timeline synchronization ability 1300 of the HEART, in one embodiment.

FIG. 13 is a screen shot of the timeline synchronization ability of the HEART display 1300. The display of the text stream is shown on the top as bar. The video data is shown on the left and the audio data is shown to the right of the video data. Biosensor data may also be captured. At the bottom the time axis is displayed. This is one of the ways the HEART display for video may be displayed.

Figure 14:
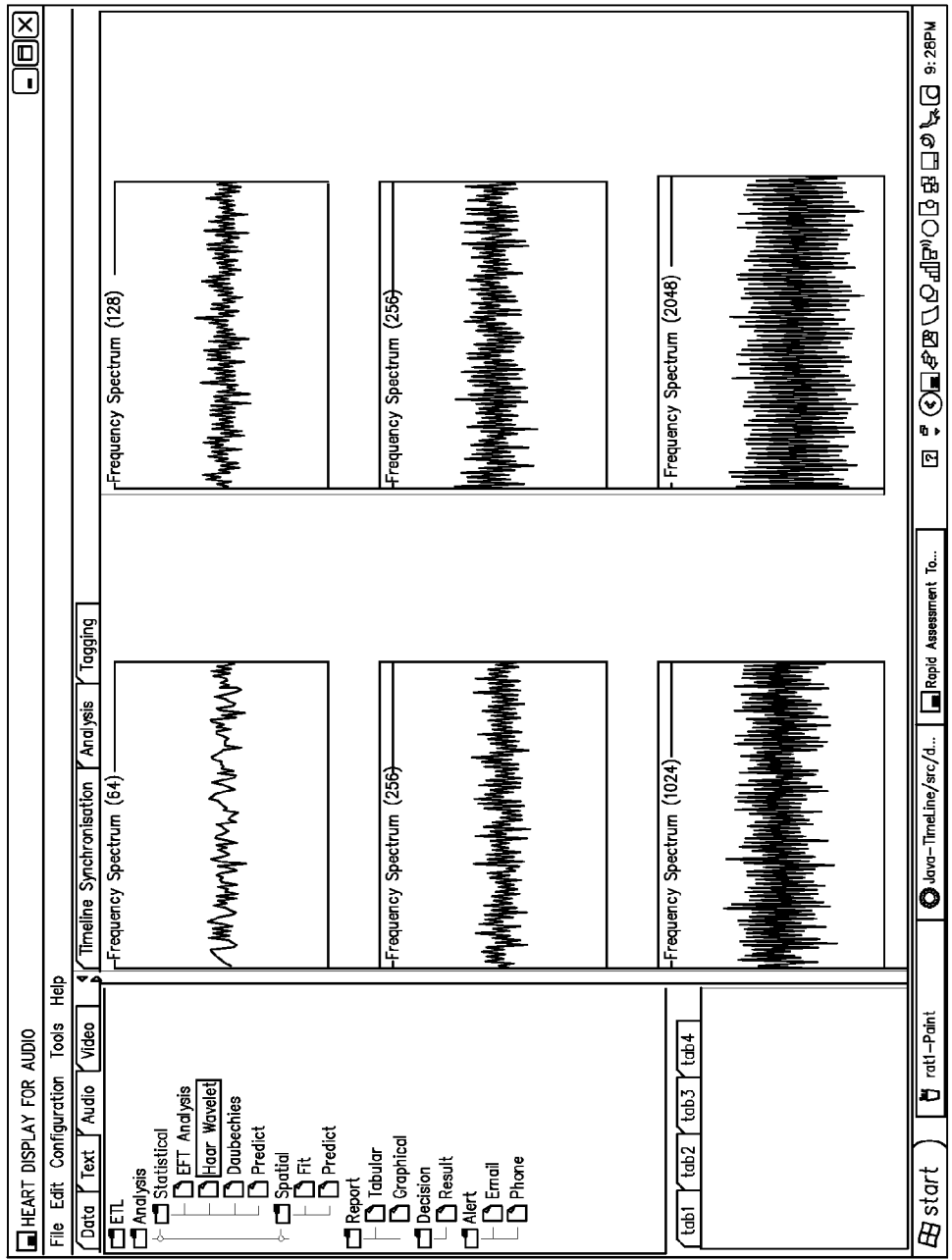
FIG. 14 shows analysis of frequency spectrum of audio signals 1400, in one embodiment.

FIG. 14 shows analysis of frequency spectrum 1400. The different frequency spectrums shown in six different graphs are expressed as a pattern for each emotional state. For example, HEART display for audio having a frequency spectrum of 64 may be interpreted as calm and normal response during an audio conversation. However, as the person gets more agitated, exhibits eccentric behavior or starts to lie, the spectrum may more adequately represent the frequency graph shown as 2048. In a similar manner, the other spectrums as shown have a specific pattern. Once this base line pattern is established for a particular event or a user the subsequent data may be appended and either the baseline is changed or the results are shown to have different expression or values for human emotions. All this data is then stored in audio database.

Figure 15:
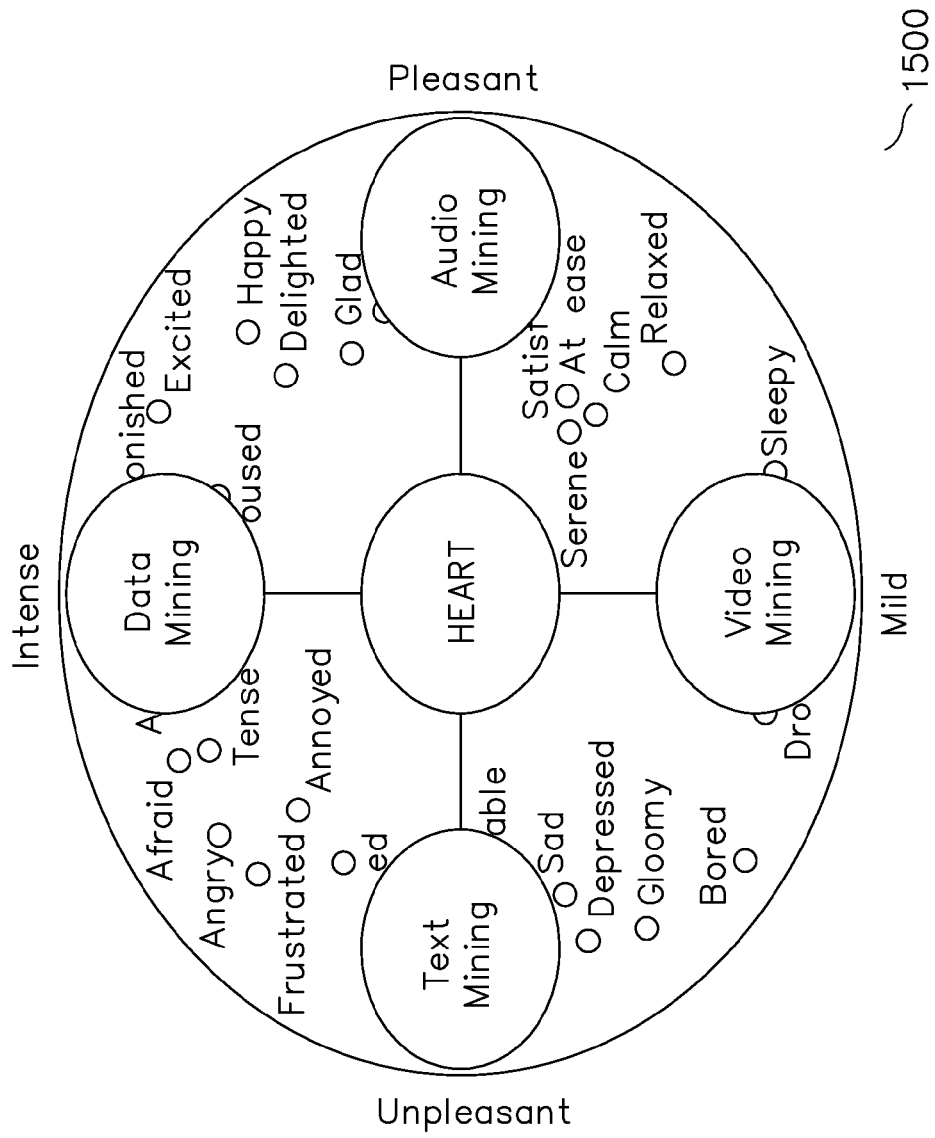
FIG. 15 shows the human emotion dictionary 1500 used for HEART, in one embodiment.

FIG. 15 shows the micro-emotions 1500 shown by a human being during audio mining, data mining, video mining and text mining. These micro emotions are sub sets of Navarasam. These subsets are captured along with the nine major emotions. The micro-emotions are clustered and mapped to nearest major emotion. However, each micro-emotion may be scored and analyzed with a powerful processor speed. This can be compared to the notion of capturing the spectrum of colors using the VIBGYOR values. There are infinite colors but they can be modeled and grouped into one of these significant VIBGYOR colors. Similarly, all the micro-emotions that fall in the range between any of these nine major emotions can be modeled and grouped into the nearest emotion. In the present embodiment, the main nine emotions are assessed for express a value for a particular human emotion.

Figure 16:
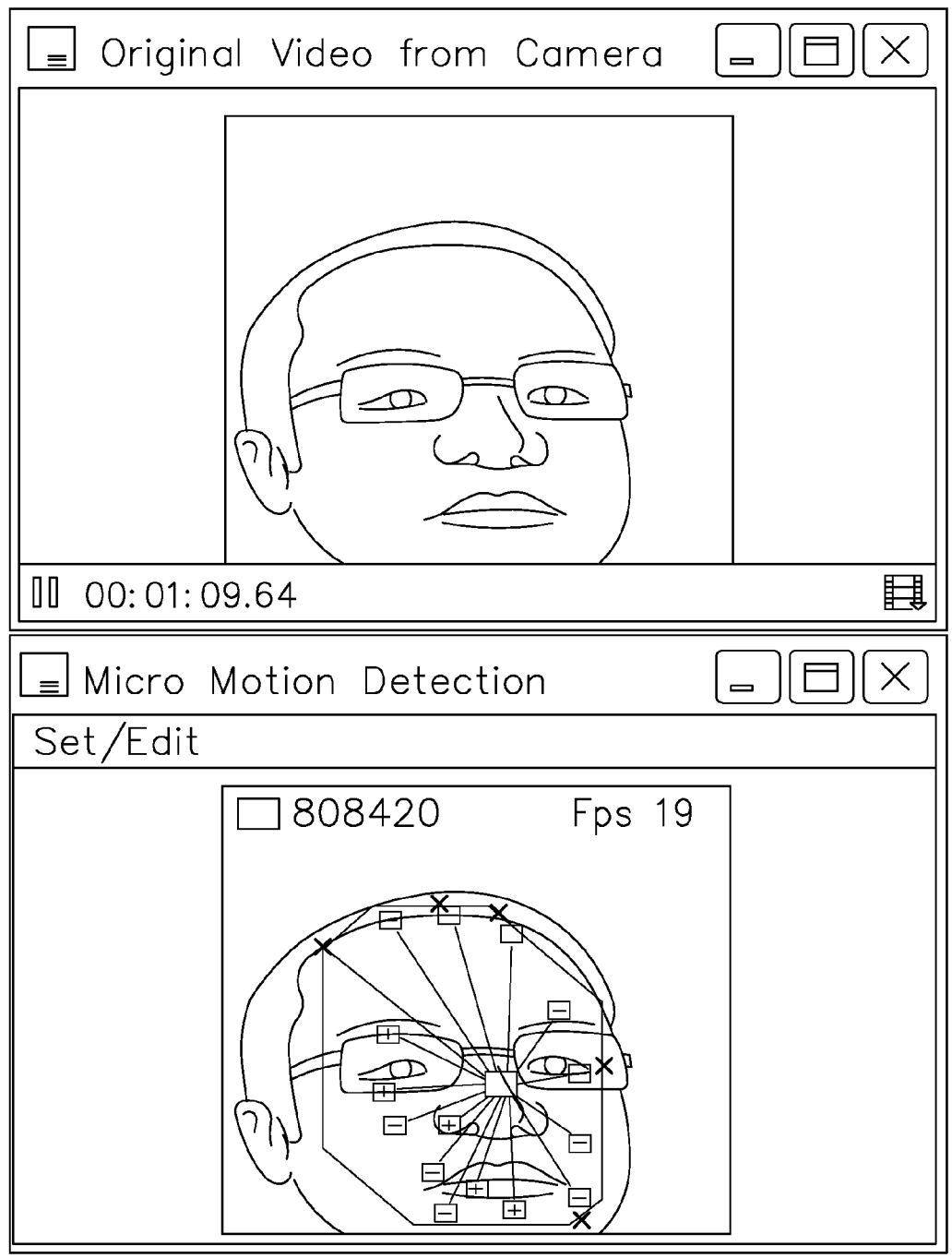
FIG. 16 shows the screen shot of video analysis using k-means clustering 1600, in one embodiment.

FIG. 16 shows the screen shot of video analysis using k-means clustering 1600. Motion Detection is calculated as follows. The user can define each motion/process via a position and application in the start of the frame by a rectangle. The rectangle can be identified by color and respective id number. Within the rectangle activity graphs are generated based on the edges of the objects. The process is to identify items in the background that are interested. This could be a busy scene but in those moments that the area within a rectangle is visible and still in the background then the process checks for changes. And note the word changes, which is more thorough than add or remove. This process can see to a fine level of detail anything that has happened to alter the background view, and this is whether the foreground is active or not. It can also be set to do this very quickly. Activity Tolerance is the level for the rectangle at which an Event is recognized to start. The clustering is fast, as is the boundary, and it maintains enough information on the fly to yield a good visual presentation and data to test for proximity to edges of other clusters. Fast build of clusters of moving pixels subject to eight sided hull distances are considered. If the distance between two clusters are extremely minimal, then both hull are merged together to represent one cluster. The centroid of the hull will indicate the direction of the motion. The sign and direction of the objects are extracted from the centroid and the identification of moving objects. Growth/Decay Model of Moving objects in Video is applied as follows:

- Apply Edge detection algorithms to identify the objects
- Compute PCA for individual frames and consider the first Eigen value for the frames.
- The Eigen values of frames will indicate the changes of objects deformation, which will indicate the sign and the direction of the changes.
- The growth and decay of moving objects will be identified, indexed and tracked.
- Noise filtering techniques based on water fall segmentation algorithms will be applied.

Figure 17:
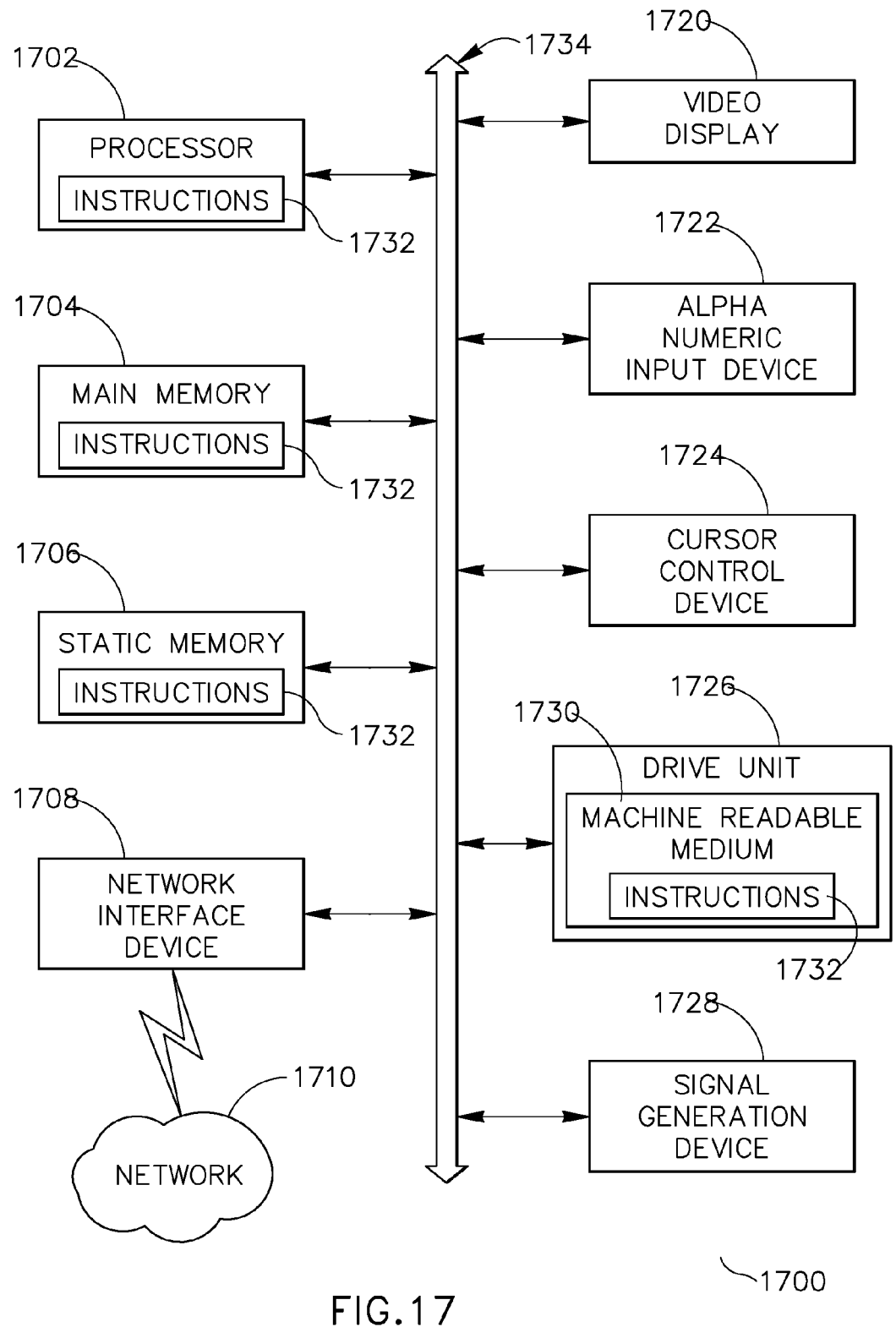
FIG. 17 is a diagrammatic system view 1700 of a computer device view, in one embodiment.

FIG. 17 is a diagrammatic system view 1700 of a computer device view in which any of the embodiments disclosed herein may be performed, according to one embodiment. Particularly, the computer system view 1700 of FIG. 17 illustrates a processor 102, a main memory 1704, a static memory 1706, a bus 1734, a video display 1720, an alpha-numeric input device 1722, a cursor control device 1724, a drive unit 1726, a signal generation device 1728, a network interface device 1708, a machine readable medium 1730, instructions 1732, and a network 110, according to one embodiment.

The computer system view 1700 may indicate a personnel computer and/or a data processing system (e.g., server) in which one or more operations disclosed herein are performed. The processor 102 may be microprocessor, a state machine, an application specific integrated circuit, a field programmable gate array, etc. The main memory 1704 may be a dynamic random access memory and/or a primary memory of a computer system. The static memory 806 may be a hard drive, a flash drive, and/or other memory information associated with the computer system. The bus 1734 may be an interconnection between various circuits and/or structures of the computer system. The video display 1720 may provide graphical representation of information on the data processing system. The alpha-numeric input device 1722 may be a keypad, keyboard and/or any other input device of text (e.g., a special device to aid the physically handicapped). The cursor control device 1724 may be a pointing device such as a mouse.

The drive unit 1726 may be a hard drive, a storage system, and/or other longer term storage subsystem. The signal generation device 1728 may be a bios and/or a functional operating system of the data processing system. The network interface device 1708 may be a device that may perform interface functions such as code conversion, protocol conversion and/or buffering required for communication to and from a network (e.g., the network 110 of FIG. 1). The machine readable medium 1730 may provide instructions on which any of the methods disclosed herein may be performed. The instructions 1732 may provide source code and/or data code to the processor 102 to enable any one/or more operations disclosed herein.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, apparatuses and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

INDUSTRIAL APPLICATION

The instant invention is very useful determining the emotional state of a human being using semiotics analysis using a processor. Various professionals and services can use the HEART generated graphs to add value to their services. The technical challenges such as emotion value prediction with seamless integration of algorithms for real time or near real time using regular computer processing power have been overcome by this invention.

What is claimed is:
1. A method, comprising:
  starting a session of a chat, video, audio and a combination thereof between a first user and a second user using a computer media;
  initializing a human emotion assessment recording technology system in a processor hosted in at least one of the computer media used by the first user, the second user and a central middleware connecting the computer media used by the first user and the second user through a network immediately after the start of the session;
  storing an expressed human emotion by the first user and the second user as a first data and a response to the human emotion as a second data while using the session of the chat, video, audio and a combination thereof by the first user and the second user in a database;

computing a n×11 matrix for the session of the chat, video, audio and a combination thereof to perform a semiotic analysis;

performing the semiotic analysis using the processor on the first data and second data to create a baseline data for the first user and second user and a subsequent data for the first user and second user;

displaying a human emotion value as a human emotion assessment reporting technology data in a graphical representation by performing hierarchical slope clustering on the baseline data and subsequent data in a real time during the session; and storing the first data, second data, baseline data, subsequent data and human emotion assessment reporting technology data in a database.

2. The method of claim 1, wherein the semiotic analysis consists of estimating a value for a sign, wherein a sign has three components comprising a sense, signifier and referent.

3. The method of claim 1, further comprising:

parsing the text present in the form of the first data and the second data using a natural language processor parser and applying an english grammatical structure to assign a varied values for the first data and the second data;

assigning the varied value for the first data and the second data, wherein the varied value is at least one of a who, whom, when, where, why, how, session ID, timestamp, sender ID, receiver ID, number of sentences and number of words; and applying a parts of speech tagging to a significant word to the first data and the second data; and storing the first data and the second data in the database to perform a historical analysis.

4. The method of claim 3, further comprising:

matching the first data and the second data with a word from the natural language processing parser having a dictionary;

populating a n×11 matrix for the first data and the second data after matching with words from the dictionary in real time for a given chat session, wherein in real time is an one minute interval;

applying a singular value decomposition algorithm using the processor to reduce the n×11 matrix to create the human emotion assessment reporting technology data; and displaying the human emotion assessment reporting technology data as a representation of a human emotion value.

5. The method of claim 4, further comprising:

performing Principal Component Analysis for the human emotion assessment reporting technology data to calculate the human emotion value for the first user and the second user over a period of time; and performing a hierarchical slope clustering for the human emotion assessment reporting technology data to calculate the human emotion value for the first user and the second user over a period of time.

6. The method of claim 1, wherein the session is the audio session between the first user and the second user.

7. The method of claim 6, further comprising:

performing a pitch analysis, frequency analysis and filtering analysis for identification of a sign and interpretation of the sign for the audio session as a human emotion assessment reporting technology data; and displaying the result for the human emotion assessment reporting technology data.

8. The method of claim 1, wherein the session is a video session.

9. The method of claim 8, further comprising:

sampling the video session for first user and second user for 5-10 frames per second;

extracting a feature from the video session;

performing a motion analysis and a growth and decay analysis to create a data for cluster analysis;

performing the cluster analysis to form a cluster data;

performing the semiotic analysis on the cluster data to create a human emotion value; and storing in the database and displaying the human emotion value.

10. A system, comprising:

a processor to house the human emotion assessment reporting technology engine to initiate the middleware server and a natural language processing server;

a middleware to compute a n×11 matrix for a session of a chat, video, audio and a combination thereof to perform a semiotic analysis and process the session the chat, video, audio and combination thereof between a first user and a second user and perform semiotic analysis; and a database to store a first user data and a second user data and a semiotic analysis data.

11. The system of claim 10, wherein the semiotic analysis consists of a combination of sense analysis, signifier analysis and referent analysis.

12. The system of claim 11, wherein the sense analysis is performed using a single value decomposition algorithm to obtain a singular value for a given human emotion expressed during the session consisting at least one of the chat, video, audio and combination thereof between the first user and the second user.

13. The system of claim 12, wherein the referent analysis is performed using a hierarchical slope clustering to find a trend of expressed human emotions as a historical perspective.

14. The system of claim 11, wherein the signifier analysis is performed using principal component analysis to predict the variation in the first axis and a second axis of the singular value decomposition data.

15. A method, comprising:

initiating session of a chat using a computer between a first user and a second user;

initializing the human emotion assessment technology system to initialize the natural language processing parser and an emotional dictionary;

computing a n×11 matrix for a session of the chat, to perform a semiotic analysis; and performing a semiotic analysis for session of chat and displaying a human emotion value.

16. The method of claim 15, wherein the human emotion value is tabulated for nine specific emotions and their intervals.

17. The method of claim 15, wherein the emotional dictionary is populated using Seekingwords, LIWCwords, Forrestwords, Wordnetwords, Bodywords, Legalwords, Ridwords, Buddhawords, Interjections, Rogetwords and Lavergarywords.

18. The method of claim 15, further comprising:

creating a n×11 matrix to perform single value decomposition to perform a semiotic analysis for the chat session.

19. The method of claim 18, further comprising:

performing a sense analysis using the n×11 matrix by running a principal component analysis algorithm on a processor to produce a singular value data for the chat session.

20. The method of claim 19, further comprising:

performing a referent analysis using a slope hierarchical clustering algorithm on the singular value data to create a historical analysis graph for the chat session.

* * * * *